(12) United States Patent
Choi et al.

(10) Patent No.: US 12,547,214 B2
(45) Date of Patent: Feb. 10, 2026

(54) DISPLAY DEVICE

(71) Applicant: Samsung Display Co., Ltd., Yongin-si (KR)

(72) Inventors: Min-Hoon Choi, Seoul (KR); Minsang Koo, Seongnam-si (KR); Kyung-Man Kim, Anyang-si (KR); Sanghoon Kim, Hwaseong-si (KR); Seongjin Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 615 days.

(21) Appl. No.: 17/997,355

(22) PCT Filed: Nov. 12, 2020

(86) PCT No.: PCT/KR2020/015832
§ 371 (c)(1),
(2) Date: Oct. 27, 2022

(87) PCT Pub. No.: WO2021/225236
PCT Pub. Date: Nov. 11, 2021

(65) Prior Publication Data
US 2023/0180588 A1    Jun. 8, 2023

(30) Foreign Application Priority Data

May 6, 2020 (KR) .................. 10-2020-0054090

(51) Int. Cl.
*G06F 1/16* (2006.01)
*H10K 59/80* (2023.01)
(Continued)

(52) U.S. Cl.
CPC ......... *G06F 1/1656* (2013.01); *H10K 59/879* (2023.02); *H10K 59/8792* (2023.02);
(Continued)

(58) Field of Classification Search
CPC ............... G06F 1/1656; H10K 59/879; H10K 59/8792; H10K 59/8722; H10K 59/873;
(Continued)

(56) References Cited

U.S. PATENT DOCUMENTS 10,603,876 B2 * 3/2020 Kwak ..................... C08L 51/00
10,882,286 B2    1/2021 Oh et al.
(Continued)

FOREIGN PATENT DOCUMENTS

KR        10-1243719 B1    3/2013
KR     10-2016-0034078 A   3/2016
(Continued)

OTHER PUBLICATIONS

Chinese Examination report issued Jan. 17, 2025, in corresponding Chinese Patent Application No. CN 202080100492.5 (8 pages).
(Continued)

*Primary Examiner* — Mary Ellen Bowman
(74) *Attorney, Agent, or Firm* — Womble Bond Dickinson (US) LLP

(57) ABSTRACT

A display device includes a display module, a glass substrate, a buffer film, and a light blocking layer, the buffer film includes a base film and a nanoparticle coating layer provided on at least one surface of the base film, and the nanoparticle coating layer includes a binder and a plurality of nanoparticles. Therefore, the display device according to one or more embodiments may have excellent durability and visibility.

20 Claims, 11 Drawing Sheets

(51) Int. Cl.
   *H10K 77/00* (2023.01)
   *H10K 77/10* (2023.01)
   *H10K 102/00* (2023.01)

(52) U.S. Cl.
   CPC ........... *H10K 77/00* (2023.02); *H10K 77/111* (2023.02); *H10K 59/8722* (2023.02); *H10K 59/873* (2023.02); *H10K 2102/311* (2023.02); *H10K 2102/331* (2023.02)

(58) Field of Classification Search
   CPC .. H10K 77/00; H10K 77/11; H10K 2102/311; H10K 2102/331
   See application file for complete search history.

(56) References Cited

U.S. PATENT DOCUMENTS

| | | |
|---|---|---|
| 11,201,194 B2 | 12/2021 | Noh et al. |
| 11,217,778 B2 * | 1/2022 | Kim ..................... H10K 59/13 |
| 2003/0068486 A1 | 4/2003 | Arney et al. |
| 2015/0195915 A1 | 7/2015 | Namkung |
| 2017/0335136 A1 | 11/2017 | Lee |
| 2018/0352664 A1 | 12/2018 | Park et al. |
| 2019/0094420 A1 | 3/2019 | Choi et al. |

FOREIGN PATENT DOCUMENTS

| | | |
|---|---|---|
| KR | 20170080436 A | 7/2017 |
| KR | 10-2017-0130866 A | 11/2017 |
| KR | 10-2018-0074544 A | 7/2018 |
| KR | 10-2018-0079812 A | 7/2018 |
| KR | 10-2018-0133287 A | 12/2018 |
| KR | 10-2019-0014303 A | 2/2019 |
| KR | 10-1976900 B1 | 5/2019 |
| KR | 10-2004028 B1 | 7/2019 |
| KR | 10-2027570 B1 | 10/2019 |
| KR | 10-2020-0019025 A | 2/2020 |
| KR | 20200016417 A | 2/2020 |

OTHER PUBLICATIONS

International Search Report of PCT/KR2020/015832, Feb. 16, 2021, 3 pages.

* cited by examiner

DISPLAY DEVICE

CROSS-REFERENCE TO RELATED APPLICATIONS

This application is a U.S. National Phase Patent Application of International Patent Application Number PCT/KR2020/015832, filed on Nov. 12, 2020, which claims priority to Korean Patent Application Number 10-2020-0054090, filed on May 6, 2020, the entire content of all of which is incorporated herein by reference.

BACKGROUND

1. Field

One or more embodiments of the present disclosure relate to a display device. More particularly, the present disclosure relates to a display device having excellent durability and visibility.

2. Description of Related Art

Electronic equipment for providing an image to a user such as smartphones, digital cameras, laptop computers, navigations, and smart televisions includes a display device for displaying an image. The display device generates an image to provide the image to the user through a display screen.

In addition to the display device having a flat shape, various flexible display devices that are capable of being deformed, folded, or rolled into a curved shape have been developed. The flexible display devices that are variously modified in shape may be easily carried and may improve user's convenience.

Studies are being conducted to improve durability and visibility of various display devices by alleviating external impacts applied thereto.

SUMMARY

An object of the present disclosure is to provide a display device having excellent durability against external impacts.

An object of the present disclosure is to provide a display device having excellent visibility.

A display device according to one or more embodiments of the present disclosure includes a display module, a glass substrate provided on the display module, a buffer film provided between the display module and the glass substrate, and a light blocking layer provided directly on a partial area of the buffer film. The buffer film may include a base film and a nanoparticle coating layer. A nanoparticle coating layer may be provided on at least one surface of the base film and may include a binder and a plurality of nanoparticles.

A ratio of a total weight of the plurality of nanoparticles to a total weight of the nanoparticle coating layer may be 7% and more to 90% or less.

Each of the plurality of nanoparticles may have a diameter of 10 nanometers or more and 1,000 nanometers or less.

The binder may include at least one of an acrylic compound, a urethane compound, a siloxane compound, an imide compound, or an epoxy compound.

Each of the plurality of nanoparticles may have a hollow structure, a pore structure, or a full-type structure.

The base film may include a top surface, a bottom surface facing the top surface, and a side surface connected to the top surface and the bottom surface. The nanoparticle coating layer may be directly provided on at least one surface of the top surface and the bottom surface.

The light blocking layer may be directly provided on a surface facing the surface on which the nanoparticle coating layer is directly provided.

The base film may have a thickness of 20 micrometers or more and 100 micrometers or less. The nanoparticle coating layer may have a thickness of 1 micrometer or more and 10 micrometers or less.

The base film may include at least one of polyimide, polyethylene terephthalate, polycarbonate, cycloolefin polymer, or triacetyl cellulose (cellulose triacetate). The base film may have a visible light transmittance of about 80% or more.

The display device may include an adhesive layer directly provided on the nanoparticle coating layer. A refractive index of the nanoparticle coating layer may have a value between a refractive index of the adjacent adhesive layer and a refractive index of the base film.

The glass substrate may include a first non-folding area, a second non-folding area, and a folding area provided between the first non-folding area and the second non-folding area.

The glass substrate may be folded based on at least one folding axis.

The glass substrate may have a thickness of 10 micrometers or more and 100 micrometers or less.

The display module may include a display element layer, a thin film encapsulation layer, and an input sensing layer. The thin film encapsulation layer may seal the display element layer. The input sensing layer may be directly provided on the thin film encapsulation layer.

The light blocking layer may include at least one of a dye or a pigment.

A foldable display device according to an embodiment of the present disclosure includes a display module, a glass substrate provided on the display module and including a folding area and a non-folding area adjacent to the folding area, a buffer film provided between the display module and the glass substrate, and a light blocking layer directly provided on a partial area of the buffer film. The buffer film may include a base film and a nanoparticle coating layer on at least one surface of the base film, the nanoparticle coating layer including a binder and a plurality of nanoparticles, and a ratio of a total weight of the plurality of nanoparticles to a total weight of the nanoparticle coating layer may be 7% and more to 90% or less.

Each of the plurality of nanoparticles may have a full-type structure.

Each of the plurality of nanoparticles may include silica, a carbon nanotube, or a carbon nanofiber.

The foldable display device may further include an adhesive layer that is provided between the glass substrate and the buffer film and between the buffer film and the display module.

The base film may have a refractive index of 1.5 or more and 1.6 or less. The adhesive layer may have a refractive index of 1.4 or more and 1.5 or less. The nanoparticle coating layer may have a refractive index greater than that of the adhesive layer, and the base film has a refractive index greater than that of the nanoparticle coating layer.

The display device according to the embodiments of the present disclosure may have excellent durability against external impacts.

The display device according to the embodiments of the present disclosure may have excellent visibility.

BRIEF DESCRIPTION OF THE DRAWINGS

The above and other aspects, features, and enhancements of certain embodiments of the disclosure will be more apparent from the following description taken in conjunction with the accompanying drawings, in which.

DETAILED DESCRIPTION

Figure 1A:
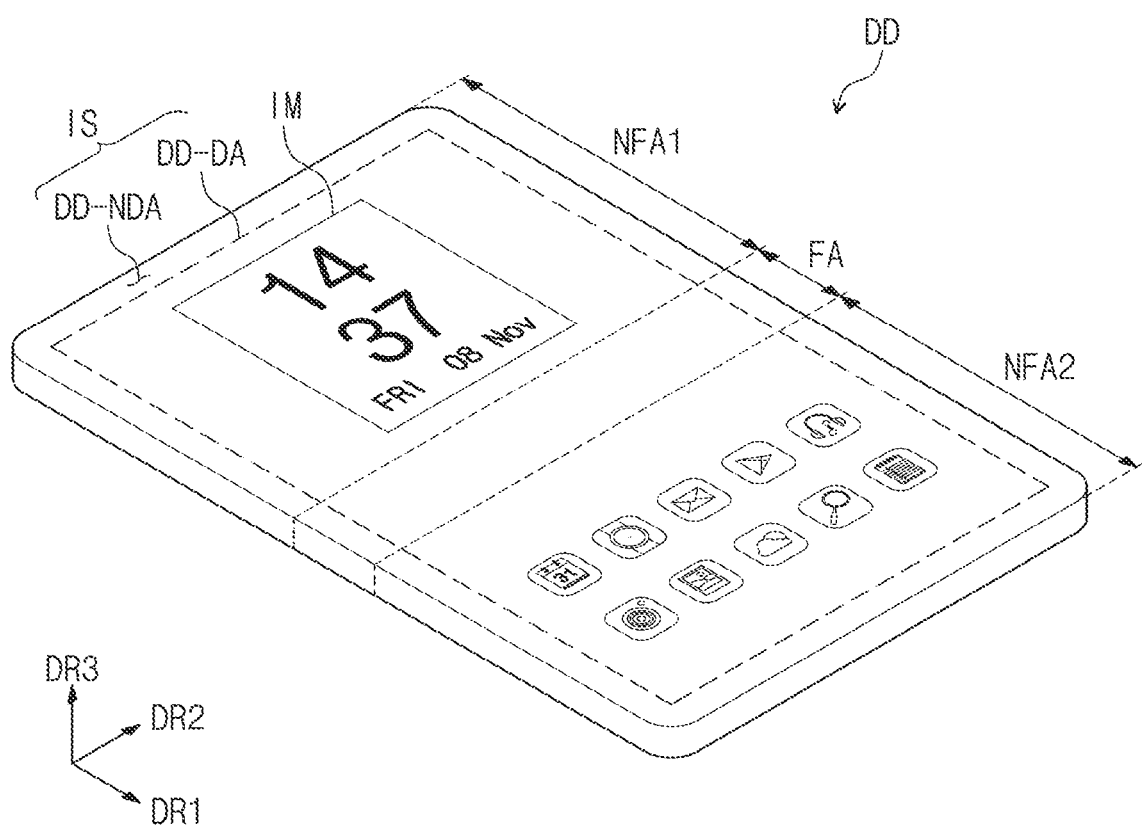
FIG. 1A is a perspective view illustrating a first operation of a display device according to one or more embodiments of the present disclosure.

In this specification, it will also be understood that when one component (or area, layer, portion) is referred to as being "on", "connected to", or "coupled to" another component, it can be directly provided/connected/coupled on/to the one component, or an intervening third component may also be present.

In this specification, that "a constituent A is directly provided on a constituent B" may mean that an adhesive member is not provided between the constituents A and B, but the constituents A and B contact each other.

Like reference numerals refer to like elements throughout. Also, in the figures, the thickness, ratio, and dimensions of components are exaggerated for clarity of illustration.

The term "and/or" includes any and all combinations of one or more of the associated listed items.

As used herein, expressions such as "at least one of", "one of", and "selected from", when preceding a list of elements, modify the entire list of elements and do not modify the individual elements of the list. For example, "at least one selected from a, b and c", "at least one of a, b or c", and "at least one of a, b and/or c" may indicate only a, only b, only c, both (e.g., simultaneously) a and b, both (e.g., simultaneously) a and c, both (e.g., simultaneously) b and c, all of a, b, and c, or variations thereof.

As used herein, the terms "substantially", "about", and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

It will be understood that although the terms such as 'first' and 'second' are used herein to describe various elements, these elements should not be limited by these terms. The terms are only used to distinguish one component from other components. For example, a first element referred to as a first element in one or more embodiments can be referred to as a second element in another embodiment without departing from the scope of the appended claims. The terms of a singular form may include plural forms unless referred to the contrary.

Also, "under", "below", "above", "upper", and the like are used for explaining relation association of components illustrated in the drawings. The terms may be a relative concept and described based on directions expressed in the drawings.

Also, in this specification, when an element is provided "on" another element, it may include provided on a lower portion as well as an upper portion of another element.

Unless otherwise defined, all terms (including technical and scientific terms) used herein have the same meaning as commonly understood by a person of ordinary skill in the art to which the present disclosure belongs. Also, terms such as defined terms in commonly used dictionaries are to be interpreted as having meanings consistent with meaning in the context of the relevant art and are expressly defined herein unless interpreted in an ideal or overly formal sense.

The meaning of "include" or "comprise" specifies a property, a fixed number, a step, an operation, an element, a component or a combination thereof, but does not exclude other properties, fixed numbers, steps, operations, elements, components or combinations thereof.

Hereinafter, embodiments of the present disclosure will be described with reference to the accompanying drawings.

Figure 1B:
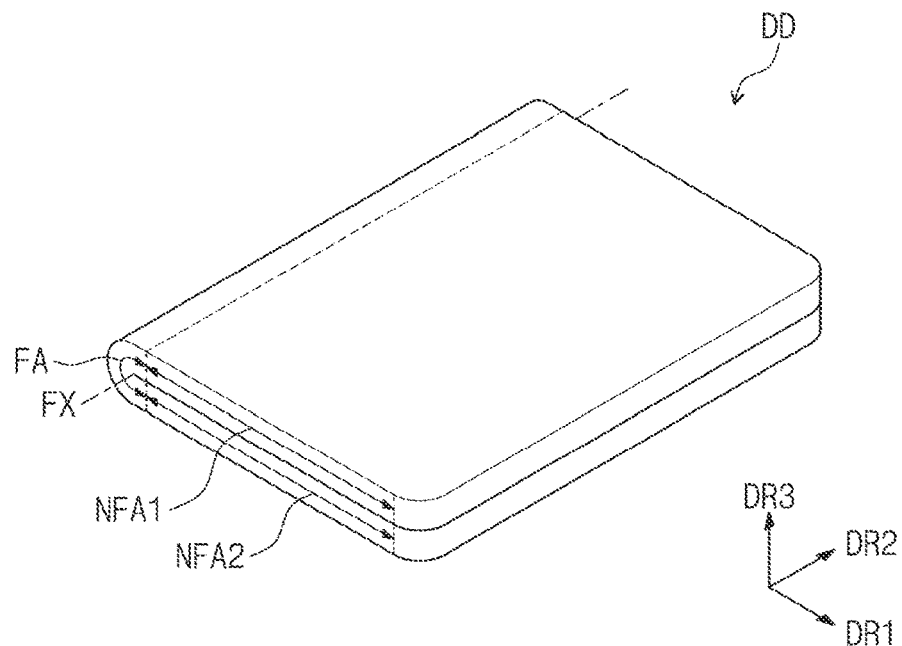
FIG. 1B is a perspective view illustrating a second operation of the display device according to one or more embodiments of the present disclosure.
Figure 1C:
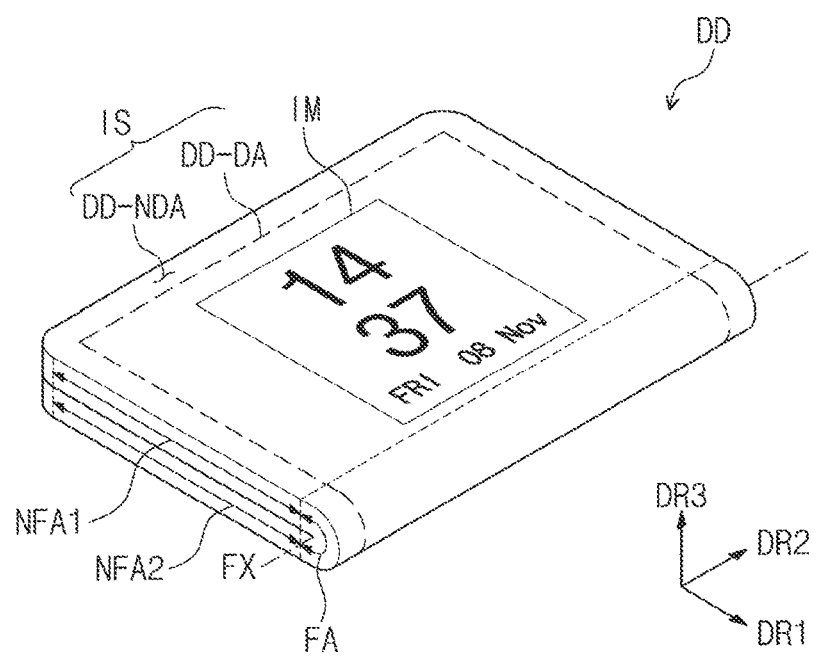
FIG. 1C is a perspective view illustrating a third operation of the display device according to one or more embodiments of the present disclosure.

FIG. 1A is a perspective view illustrating a first operation mode of a display device DD according to one or more embodiments of the present disclosure. FIG. 1B is a perspective view illustrating a second operation mode of a display device DD according to one or more embodiments of the present disclosure. FIG. 1C is a perspective view illustrating a third operation mode of a display device DD according to one or more embodiments of the present disclosure.

As illustrated in FIG. 1A, in a first operation mode, a display surface IS on which an image IM is displayed is parallel to a surface that is defined by a first directional axis DR1 and a second directional axis DR2. A direction normal to the display surface IS, e.g., a thickness direction of the display device DD, is indicated as a third directional axis DR3. A front surface (or top surface) and a rear surface (or bottom surface) of each of the members of the display device DD is distinguished by the third directional axis DR3. However, directions indicated as the first to third directional axes DR1, DR2, and DR3 may be a relative concept and thus changed into different directions. Hereinafter, the first to third directions may be directions indicated by the first to third directional axes DR1, DR2, and DR3 and designated by the same reference numerals, respectively.

FIGS. 1A-1C illustrate a foldable display device DD as an example of the flexible display device DD. In some embodiments, the display device DD may be a rollable or bendable display device, but is not specifically limited thereto. The flexible display device DD according to embodiments of the present disclosure may be used for large-sized electronic devices such as televisions and monitors, and small and middle-sized electronic devices such as mobile phones, tablet PC, navigation units for vehicles, game consoles, and smart watches. Hereinafter, the display device DD will be described as a foldable display device DD.

As illustrated in FIG. 1A, the display surface IS of the display device DD may include a plurality of areas. The display device DD includes a display area DD-DA on which an image IM is displayed and a non-display area DD-NDA that is adjacent to the display area DD-DA. The non-display area DD-NDA is an area on which an image IM is not displayed. FIG. 1A illustrates a clock widget as an example of the image IM. For example, the display area DD-DA may have a rectangular shape. The non-display area DD-NDA may surround the display area DD-DA. However, the embodiment of the present disclosure is not limited thereto, and the display area DD-DA and the non-display area DD-NDA may be designed in other suitable shapes. In one or more embodiments, the non-display area DD-NDA may be omitted.

As illustrated in FIGS. 1A-1C, the display device DD may include a plurality of areas defined according to the forms of operations. The display device DD may include a folding area FA that is folded on the basis of the folding axis FX and non-folding areas NFA1 and NFA2 that are not folded. The folding area FA may be provided between a first non-folding area NFA1 and a second non-folding area NFA2. Although the display device DD includes one folding area FA and two non-folding areas NFA1 and NFA2 in FIGS. 1A-1C, the embodiment is not limited thereto. For example, the display device DD may include one folding area and one non-folding area. In some embodiments, the display device DD may include three or more non-folding areas and two or more folding areas, and in this case, two or more folding axes FX may be defined.

As illustrated in FIG. 1B, the display device DD may be inner-bent (e.g., bent inwards) so that the display surfaces IS of the two non-folding areas NFA1 and NFA2 face each other. As illustrated in FIG. 1C, the display device DD may be outer-bent (e.g., bent outwards) to allow the display surface IS to be exposed to the outside.

In one or more embodiments of the present disclosure, the display device DD may operate in at least one of the operation modes illustrated in FIGS. 1A and 1B. The display device DD may be configured to repeat only the operation modes illustrated in FIGS. 1A and 1B. However, the embodiment is not limited thereto, and the folding area FA may be variously suitably defined to correspond to a shape in which the user manipulates the display device DD. For example, the folding area FA may be defined in parallel to the first directional axis DR1 or defined in a diagonal direction, unlike in FIGS. 1B and 1C.

When the display device DD includes two non-folding areas NFA, surface areas of the non-folding areas NFA may be equal to each other, but the embodiment is not limited thereto. The surface area of each of the non-folding areas NFA may be greater than that of the folding area FA. In one or more embodiments, the area of the folding area FA is not fixed, but may be determined according to a curvature radius. FIGS. 1A-1C exemplarily illustrate that the display device DD is folded based on a short axis thereof, but the display device DD may be folded based on a long axis.

Figure 2:
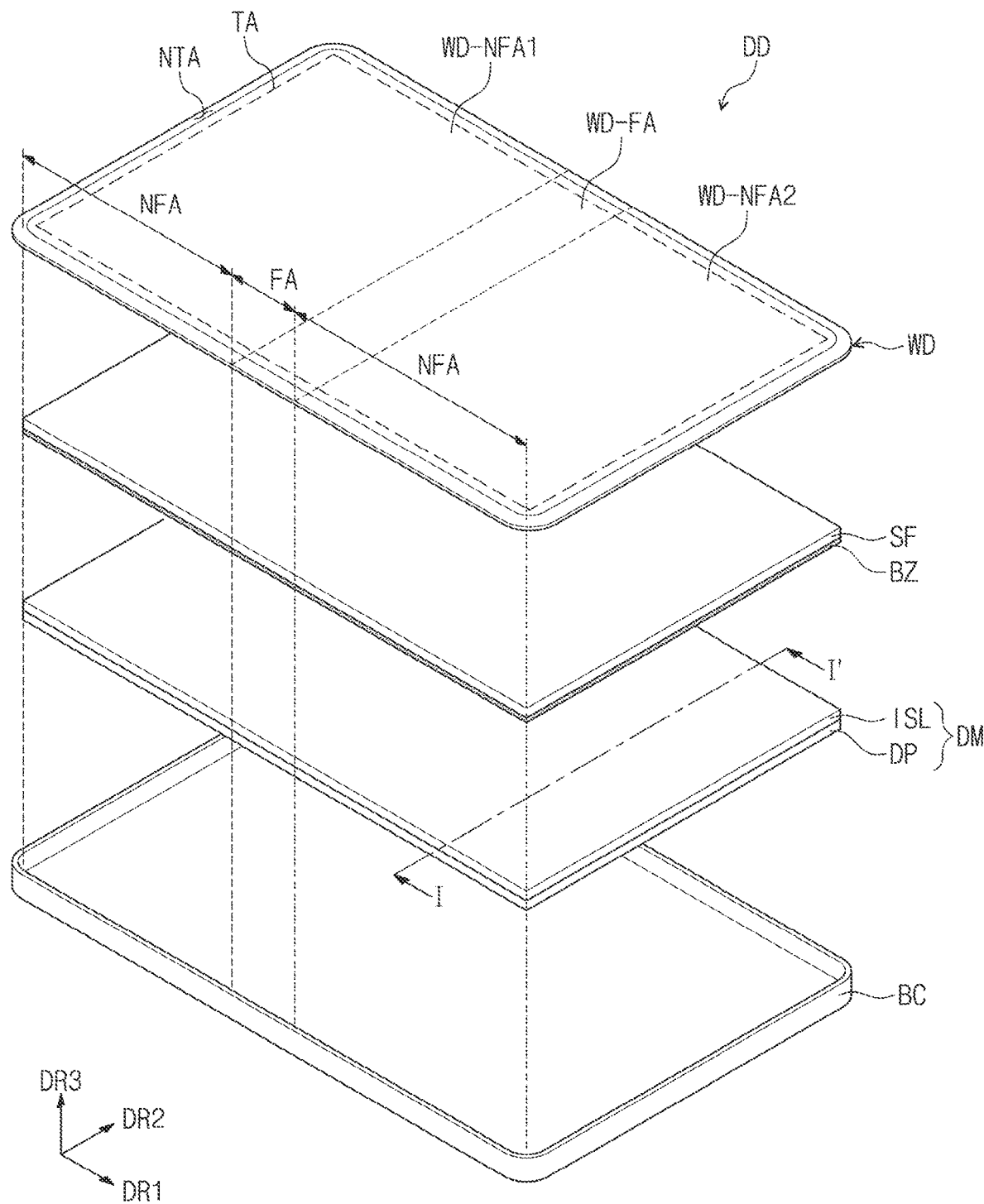
FIG. 2 is an exploded perspective view of the display device according to one or more embodiments of the present disclosure.

FIG. 2 is an enlarged perspective view of the display device DD according to one or more embodiments of the present disclosure.

Referring to FIG. 2, the display device DD may include a window WD, a buffer film SF, a light blocking layer BZ, a display module DM, and an accommodation member BC. Although not shown in FIG. 2, an adhesive layer may be provided between the window WD and the buffer film SF, and between the buffer film SF and the display module DM.

The window WD may be provided on the buffer film SF. The window WD may transmit an image provided from the display module DM to the outside. The window WD includes a transmission area TA and a non-transmission area NTA. The transmission area TA may have a shape that overlaps the display area DD-DA to correspond to the display area DD-DA. For example, an image IM displayed on the display area DD-DA of the display device DD may be visible through the transmission area TA of the window WD from the outside. The non-transmission area NTA may overlap the light blocking layer BZ, which will be described in more detail later herein.

The non-transmission area NTA may have a shape that overlaps the non-display area DD-NDA to correspond to the non-display area DD-NDA. The non-transmission area NTA may be an area having a light transmittance that is relatively less than that of the transmission area TA. However, the technical idea of the present disclosure is not limited thereto, and the non-transmission area NTA may be omitted.

The window WD may include a folding portion WD-FA and non-folding portions WD-NFA1 and WD-NFA2 spaced apart from each other with the folding portion WD-FA therebetween. The folding portion WD-FA may overlap the folding area FA. The non-folding portions WD-NFA1 and WD-NFA2 may overlap the non-folding areas NFA1 and NFA2, respectively. A top surface of the window WD may be a display surface IS on which an image (FIG. 1) is displayed. Although not shown, a film protecting the window WD may be further attached on the window WD.

In one or more embodiments, the window WD may have a thickness of 10 micrometers (μm) or more and 100 micrometers (μm) or less. In this specification, the term "thickness" means an average of the shortest distances between points on the top surface and corresponding points on the bottom surface of the component.

In one or more embodiments, the window WD may include a glass substrate. When the window WD includes a plastic substrate, wrinkles may occur in the window WD during the folding to reduce external visibility. Thus, in the display device DD according to one or more embodiments, because the window WD includes the glass substrate, the phenomenon in which the wrinkles occur may be alleviated, prevented, or reduced during the folding.

In one or more embodiments, the window WD may include $SiO_2$. The window WD may further include at least one of $Al_2O_3$, $Li_2O$, $Na_2O$, $K_2O$, MgO, or CaO, in addition to $SiO_2$. In addition, the window WD may further include $Fe_2O_3$, ZnO, $TiO_2$, or $P_2O_5$. In one embodiment, the window WD may be tempered glass. For example, the window WD may be a chemically strengthened glass that is ion-substituted. The window WD may be formed from a base glass including a first alkali metal ion having a first ionic radius. The window WD may be formed by substituting the first alkali metal ion of the base glass with a second alkali metal ion having an ionic radius greater than that of the first alkali metal ion.

The buffer film SF may be provided on the display module DM. The buffer film SF may absorb an external impact to protect the display device DD. In addition, the buffer film SF may serve as a base layer on which the light blocking layer BZ is printed. More detailed description of the buffer film SF will be provided herein below.

The light blocking layer BZ may be provided on the buffer film SF. The light blocking layer BZ may be directly on the buffer film SF. For example, the light blocking layer BZ may be provided along an edge portion of the buffer film SF.

When the light blocking layer BZ is directly provided on the window WD, the window WD may be exposed to an external environment, such as being in contact with external equipment such as printing equipment, during the printing process of the light blocking layer BZ. In this process, the window WD may be damaged. Particularly, when the window WD is the glass substrate, because the glass substrate has flexibility less than that of a plastic substrate, the glass substrate may be more easily damaged. In addition, when the glass substrate is a thin glass substrate having a thickness of about 100 nanometers or less, the thin glass substrate may be more easily damaged than a glass having a thicker thickness. In the display device DD according to one or more embodiments, because the light blocking layer BZ is provided on the buffer film SF, the damage of the window WD may be prevented or reduced, and the durability of the display device DD may be improved.

The light blocking layer BZ may be provided to overlap the non-display area DD-NDA. The light blocking layer BZ may define the display area DD-DA and the non-display area DD-NDA. The light blocking layer BZ may be provided to overlap the non-transmission area NTA and overlap the transmission area TA. The light blocking layer BZ may define the transmission area TA and the non-transmission area NTA.

The light blocking layer BZ may include a resin composition and a colorant. The light blocking layer BZ may include at least one of one or more pigments or one or more dyes as the colorant.

Although not limited thereto, the pigment may include a black pigment and/or a white pigment. For example, the pigment may include carbon black, graphite, metal oxide, organic black pigments, azo pigments, phthalocyanine pigments, quinacridone pigments, isoindolinone pigments, isoindoline pigments, perylene pigments, perinone pigments, dioxazine pigments, anthraquinone pigments, dianthraquinonyl pigments, anthrapyrimidine pigments, anthanthrone pigments, indanthrone pigments, pravanthrone pigments, pyranthrone pigments, diketopyrroropyrrole pigments, calcium carbonate, lead carbonate, barium carbonate, barium sulfate, lead sulfate, lead phosphate, zinc phosphate, titanium oxide, aluminum oxide, silicon dioxide, zinc oxide, antimony oxide, zirconium oxide, tin oxide, zinc sulfide, strontium sulfide, strontium titanate, barium tungstate, lead metasilicate, talc, kaolin, clay, bismuth chloride, and/or calcium hydroxide white pigments.

Although not limited thereto, the dye may include black dyes, violet dyes, and/or blue dyes. For example, the dye may include perylene dyes, anthraquinone dyes, triarylmethane dyes, phthalocyanine dyes, xanthene dyes, and/or dipyrromethene dyes.

Because the light blocking layer BZ includes a colorant, the light blocking layer BZ may have a color, and thus, the visibility of the structures inside the display device DD from the outside may be prevented or reduced.

The accommodation member BC may accommodate the display module DM. Although not shown, the accommodation member BC may include a hinge for providing a folding axis. The hinge may be formed at a portion of the accommodation member BC, which overlaps the folding area FA. In one or more embodiments, the accommodation member BC may be omitted.

Figure 3A:
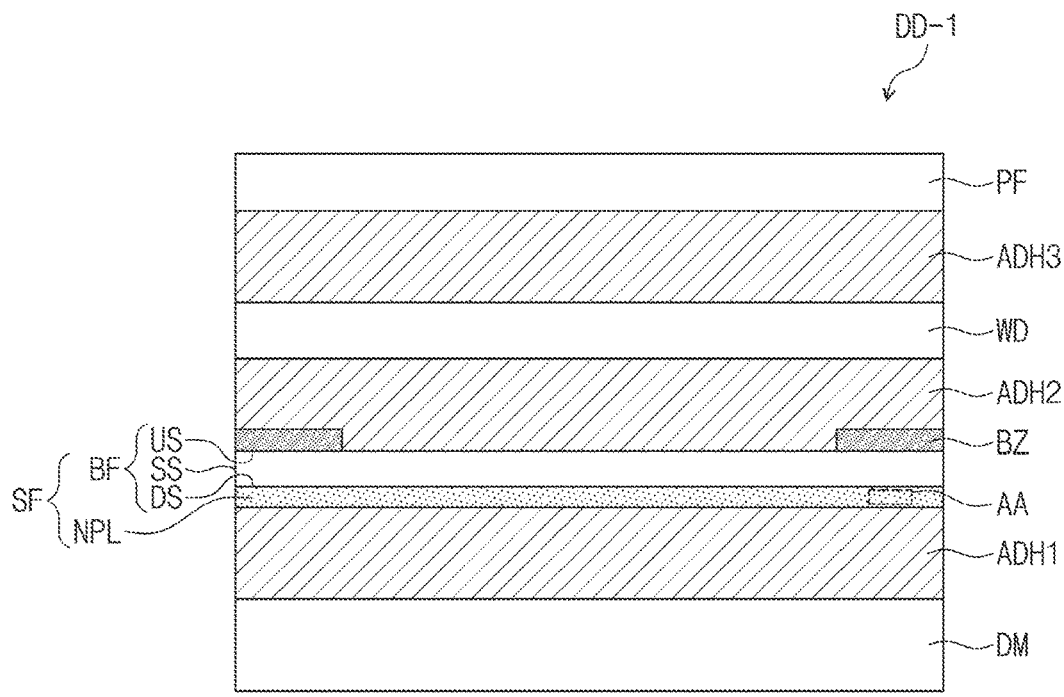
FIGS. 3A and 3B are cross-sectional views of the display device according to one or more embodiments of the present disclosure.
Figure 3B:
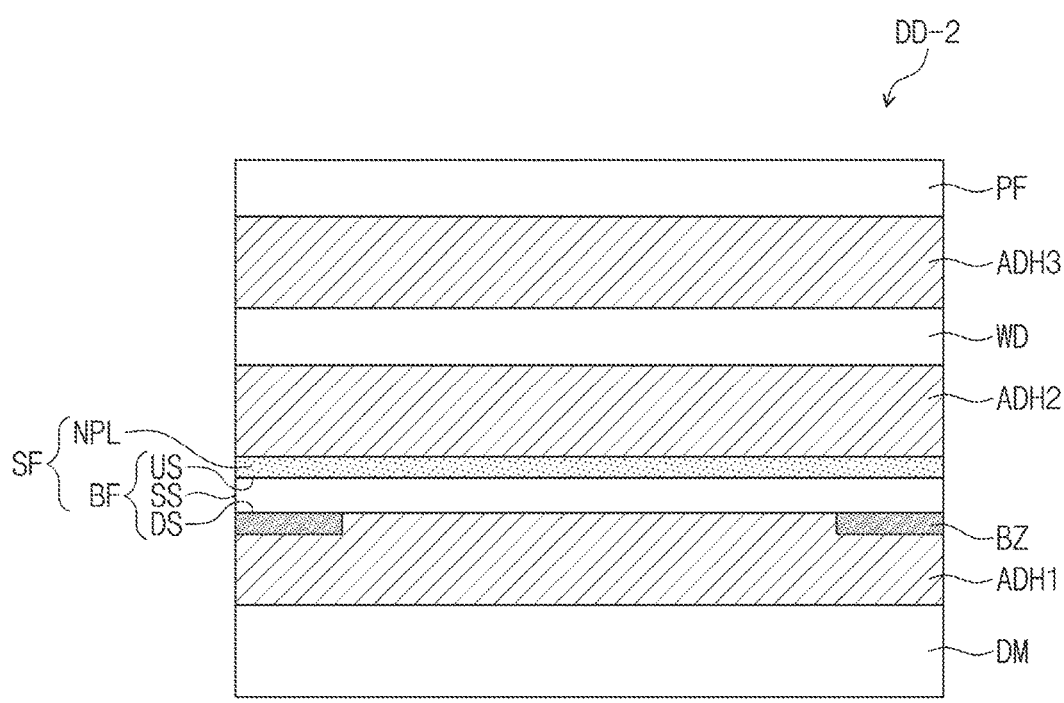
Figure 3C:
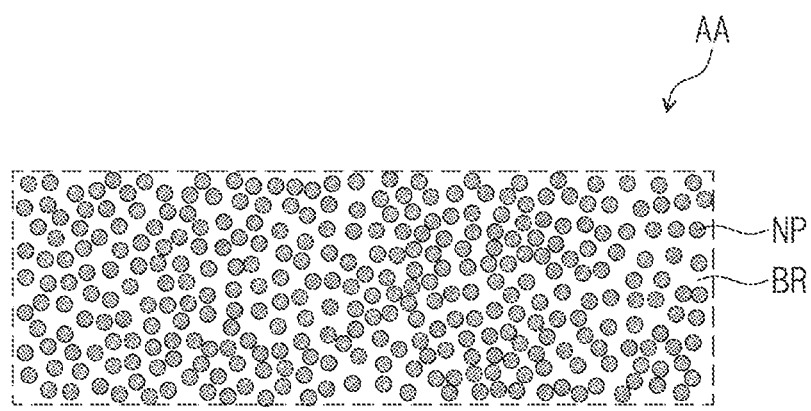
FIG. 3C is an enlarged view illustrating an area AA of FIG. 3A.

FIGS. 3A and 3B are cross-sectional views of display devices DD-1 and DD-2 according to one or more embodiments of the present disclosure, respectively. FIG. 3C is an enlarged view illustrating an area AA of FIG. 3A.

Referring to FIGS. 3A and 3B, a protective film PF may be provided on the window WD. The protective film PF may include at least one of polyamide, polyethylene terephthalate, polyimide, polycarbonate, polymethyl methacrylate, or triacetyl cellulose (cellulose triacetate). The protective film PF may be provided on the window WD to prevent or reduce damage to the window WD by an external impact. The protective film PF may have a thickness of about 30 micrometers or more and about 100 micrometers or less.

A first adhesive layer ADH1 may be provided between the display module DM and the buffer film SF, a second adhesive layer ADH2 may be provided between the buffer film SF and the window WD, and a third adhesive layer ADH3 may be provided between the window WD and the protective film PF. However, the present disclosure is not limited thereto, and some or all of the adhesive layers may be omitted. The first to third adhesive layers ADH1, ADH2, and ADH3 may be pressure sensitive adhesives.

The first to third adhesive layers ADH1, ADH2, and ADH3 may be optically transparent adhesive layers. For example, each of the first to third adhesive layers ADH1, ADH2, and ADH3 may be an optically clear tape or an optically clear resin.

In one or more embodiments, the first to third adhesive layers ADH1, ADH2, and ADH3 may include the same or different materials. In some embodiments, the first to third adhesive layers ADH1, ADH2, and ADH3 may include the same material at the same or different ratios. Each of the first to third adhesive layers ADH1, ADH2, and ADH3 may include at least one of an acrylate-based resin, a silicone-based resin, a urethane-based resin, an epoxy-based resin, a rubber-based resin, or a polyester-based resin.

Each of the first to third adhesive layers ADH1, ADH2, and ADH3 may have a thickness of about 20 micrometers or more and about 80 micrometers or less. When the thickness of each of the first to third adhesive layers ADH1, ADH2, and ADH3 is less than 20 micrometers, adhesion between the components may deteriorate. When the thickness of each of the first to third adhesive layers ADH1, ADH2, and ADH3 exceeds 80 micrometers, the first to third adhesive layers ADH1, ADH2, and ADH3 may be damaged when the display devices DD-1 and DD-2 are folded.

The buffer film SF may include a base film BF and a nanoparticle coating layer NPL. The base film BF may include a top surface US, a bottom surface DS facing the top surface, and a side surface SS. The side surface SS may be a surface connected to the top surface and the bottom surface. The base film BF may be used as a base layer for printing the light blocking layer BZ. In addition, the base film BF may serve to relieve or reduce the external impact.

The base film BF may be a high molecular polymer. The base film BF may be a transparent film having a visible light transmittance of about 80% or more or about 90% or more. Although the embodiment is not limited thereto, the base film BF may include at least one of polyimide, polyethylene terephthalate, polycarbonate, cycloolefin polymer, or triacetyl cellulose (cellulose triacetate). For example, the base film BF may include polyethylene terephthalate. Because the base film BF includes a polymer resin, the base film BF may not be easily damaged during the process of printing the light blocking layer BZ.

The thickness of the base film BF may be about 20 micrometers or more and 100 micrometers or less. For example, the thickness of the base film BF may be about 15 micrometers or more and 50 micrometers or less. When the thickness of the base film BF is less than about 20 micrometers, the display devices DD-1 and DD-2 may not sufficiently or suitably mitigate the external impact. When the thickness of the base film BF exceeds about 100 micrometers, the damage such as cracks may occur when the display devices DD-1 and DD-2 are folded.

The nanoparticle coating layer NPL may be directly provided on at least one surface of the base film BF. The nanoparticle coating layer NPL may be directly provided on at least one surface of the top surface US or the bottom surface DS of the base film BF.

When the nanoparticle coating layer NPL is provided on only one of the top surface US and the bottom surface DS of the base film BF, the light blocking layer BZ may be provided on a surface facing the surface on which the nanoparticle coating layer NPL is provided. For example, the light blocking layer BZ may be provided so as not to be in contact with the nanoparticle coating layer NPL. For example, when the nanoparticle coating layer NPL is provided on the top surface US of the base film BF, the light blocking layer BZ may be provided on the bottom surface DS of the base film BF, and when the nanoparticle coating layer NPL is provided on the bottom surface DS of the base film BF, the light blocking layer BZ may be provided on the top surface US of the base film BF.

When the light blocking layer BZ is directly provided on the nanoparticle coating layer NPL, the light blocking layer BZ may not be printed well, or the printed light blocking layer BZ may be easily separated. Therefore, in order to suitably position the light blocking layer BZ on the nanoparticle coating layer NPL, an additional process of pretreating the nanoparticle coating layer NPL is required or needed so that the light blocking layer BZ is printed suitably. Thus, when the light blocking layer BZ is provided on the surface opposite to the surface on which the nanoparticle coating layer NPL is provided, process efficiency may increase.

Referring to FIG. 30, the nanoparticle coating layer NPL may include a binder BR and a plurality of nanoparticles NP. The plurality of nanoparticles NP may be dispersed into the binder BR.

The binder BR may have a polarity (or surface energy) similar to that of the nanoparticles NP. As a result, aggregation of the adjacent nanoparticles NP with each other due to attractive force between the nanoparticles NP may be prevented or reduced. Thus, the binder BR may improve dispersibility of the nanoparticles NP.

In one or more embodiments, the binder BR may include at least one of an acrylic compound, a urethane compound, a siloxane compound, an imide compound, or an epoxy compound. The foregoing compounds may be, respectively, for example, a polyacrylic resin, a polyurethane-based resin, a polysiloxane-based resin, a polyimide-based resin, and a polyepoxy-based resin.

Each of the plurality of nanoparticles NP may have a diameter of 10 nanometers or more and 1,000 nanometers or less. For example, the diameter of each of the plurality of nanoparticles NP may be about 20 nanometers or more and about 100 nanometers or less, or about 30 nanometers or more and about 60 nanometers or less. In this specification, the diameter of the non-spherical nanoparticles NP may mean an average length of line segments connecting two points to each other on a circumference of the nanoparticles NP as straight lines passing through a center of gravity of the nanoparticles NP.

When the diameter of the nanoparticles NP is less than 10 nanometers, the nanoparticles NP are easily agglomerated with each other by the attractive force, and nanoparticles NPs may be aggregated and provided in only a portion of the binder BR. When the nanoparticles NP are aggregated in some areas, the external impact may not be easily absorbed as compared to a case when the nanoparticles NP are provided to be dispersed. When the diameter of the nanoparticles NP exceeds 1,000 nanometers, the visibility of the display device DD may be reduced.

Each of the plurality of nanoparticles NP may include silica ($SiO_2$), a carbon nanotube, or a carbon nanofiber. For example, each of the plurality of nanoparticles may include silica. Each of the plurality of nanoparticles NP may have a hollow structure, a pore structure, or a full-type structure. Each of the plurality of nanoparticles NP may have various suitable shapes, such as a linear, spherical, quasi-sphere, polygonal, dendrimer, fiber, flake, or lamellar shape. The plurality of nanoparticles NP may have a symmetrical structure. However, the embodiment is not limited thereto, and the plurality of nanoparticles NP may have an asymmetric structure.

The hollow structure may have a shape based on a spherical shape. For example, the hollow structure may be a spherical or ellipsoidal shape. The hollow structure may have a quasi-spherical shape having a curvature on a surface of the sphere. The nanoparticles NP having a hollow structure may include a hollow (e.g., an empty space inside) and a shell. The shell defines a hollow. The shell may be formed to surround the hollow and may cover the hollow. The shell may include silica.

The hollow may be filled with an inert gas. More specifically, the hollow may be filled with a nitrogen gas, a helium gas, or an argon gas. For example, when the hollow structure is synthesized under a nitrogen atmosphere, the hollow may be filled with the nitrogen gas. When the hollow is filled with a reactive gas such as an oxygen gas, the reactive gas may be discharged from the hollow to react with the binder BR, and the durability of the nanoparticle coating layer NPL may be deteriorated. In the hollow structure according to one or more embodiments, because the hollow is filled with the inert gas, the durability of the nanoparticle coating layer NPL may be improved.

When the nanoparticles NP have a pore structure, the pore structure may be a microporous or mesoporous structure.

When each of the nanoparticles NP has the full-type structure, a space may not be substantially defined inside each of the nanoparticles NP. Each of the full-type nanoparticles NP refers to a nanoparticle having a full (e.g., filled) inner space. The full-type nanoparticles NP may have a single layer or may have a double layer structure including another coating layer on the single layer. The nanoparticles NP having the double-layered structure include materials having different optical properties for each layer, and thus, the optical properties (e.g., refractive index, light transmittance, etc.) of the nanoparticles NP may be adjusted.

Because the nanoparticle coating layer NPL includes the plurality of nanoparticles NP, the durability of the display device DD may be improved, and the reflectance of the external light may increase to improve the visibility. Because the hollow nanoparticle NP has a hollow structure therein, it may show an increased effect in improving the reflectance of the external light. Because the nanoparticles NP having a full-type structure have the full inner space, an effect of absorbing the external impact applied to the display device DD may be improved. The nanoparticle coating layer NPL may include at least one of a plurality of hollow-structured nanoparticles NP, a plurality of porous-structured nanoparticles NP, or a plurality of full-type nanoparticles NP.

A ratio of the total weight of the plurality of nanoparticles NP to the total weight of the nanoparticle coating layer NPL may be 7% or more and 90% or less. For example, a ratio of the total weight of the plurality of nanoparticles NP to the total weight of the nanoparticle coating layer NPL may be 40% or more and 90% or less.

When the ratio of the total weight of the plurality of nanoparticles NP is less than 7%, the impact absorption effect and the antireflection effect of the nanoparticle coating layer NPL may be reduced. When the ratio of the total weight of the plurality of nanoparticles NP exceeds 90%, the transmittance of light emitted from the display panel may be reduced, and an amount of the binder BR may be small so that the plurality of nanoparticles NP may not be sufficiently spread.

A thickness of the nanoparticle coating layer NPL may be 1 micrometer or more and 10 micrometers or less, 1 micrometer or more and 8 micrometers or less, 1 micrometer or more and 6 micrometers or less, or 1 micrometer or more and 5 micrometers or less. When the thickness of the nanoparticle coating layer NPL is less than 1 micrometer, the impact absorbing effect and the antireflection effect of the nanoparticle coating layer NPL may be reduced. When the thickness of the nanoparticle coating layer NPL exceeds 10 micrometers, the display device DD may be easily damaged while the folding and unfolding operations thereof is repeated.

A refractive index of the nanoparticle coating layer NPL may have a value between a refractive index of the adjacent adhesive layer and a refractive index of the base film BF. The refractive index of the nanoparticle coating layer NPL may be greater than that of the adjacent adhesive layer and less than that of the base film BF. For example, in the display device DD-1 of FIG. 3A, the refractive index of the nanoparticle coating layer NPL may be greater than that of the first adhesive layer ADH1 and less than that of the base film BF. In the display device DD-2 of FIG. 3B, the refractive index of the nanoparticle coating layer NPL may be greater than that of the second adhesive layer ADH2 and less than that of the base film BF. Because the nanoparticle coating layer NPL has a value between the refractive indexes of two adjacent components, a problem in which the reflectance increases due to a difference in refractive index between interfaces may be alleviated or reduced. In this specification, the refractive index means a refractive index in vacuum when measured at a temperature of 20° C. by using a D (589 nm) line in a sodium spectrum.

In one or more embodiments, the refractive index of the base film BF may be greater than that of each of the first to third adhesive layers ADH1, ADH2, and ADH3. For example, each of the first to third adhesive layers ADH1, ADH2, and ADH3 may have a refractive index of 1.4 or more and 1.5 or less. The refractive index of the base film BF may be 1.5 or more and 1.6 or less.

FIGS. 4A-4D are cross-sectional views of display devices DD-3, DD-4, DD-5, and DD-6 according to one or more embodiments of the present disclosure, respectively.

Figure 4A:
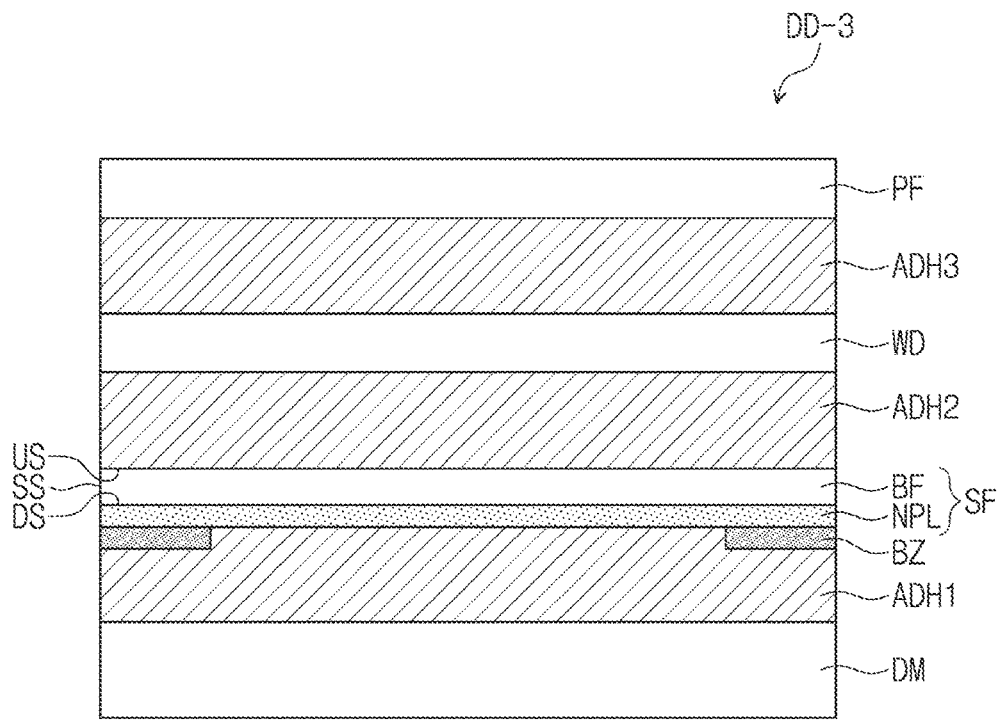
FIGS. 4A-4D are cross-sectional views of the display device according to one or more embodiments of the present disclosure.
Figure 4B:
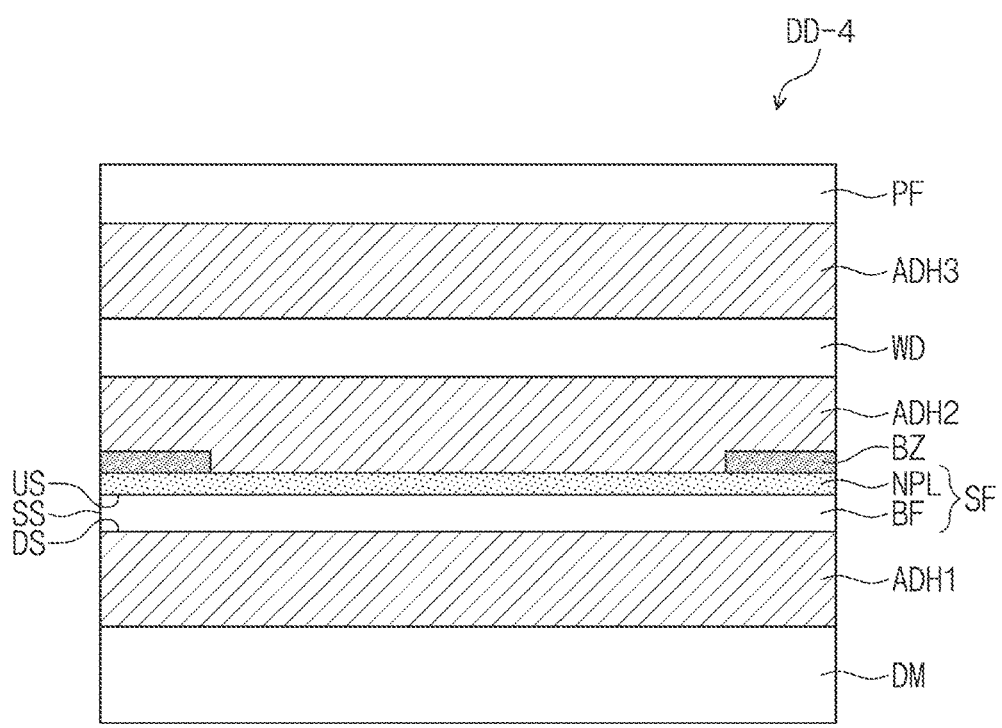

Referring to FIGS. 4A and 4B, in the display devices DD-3 and DD-4 according to one or more embodiments, the light blocking layer BZ may be directly provided on the nanoparticle coating layer NPL if necessary.

Figure 4C:
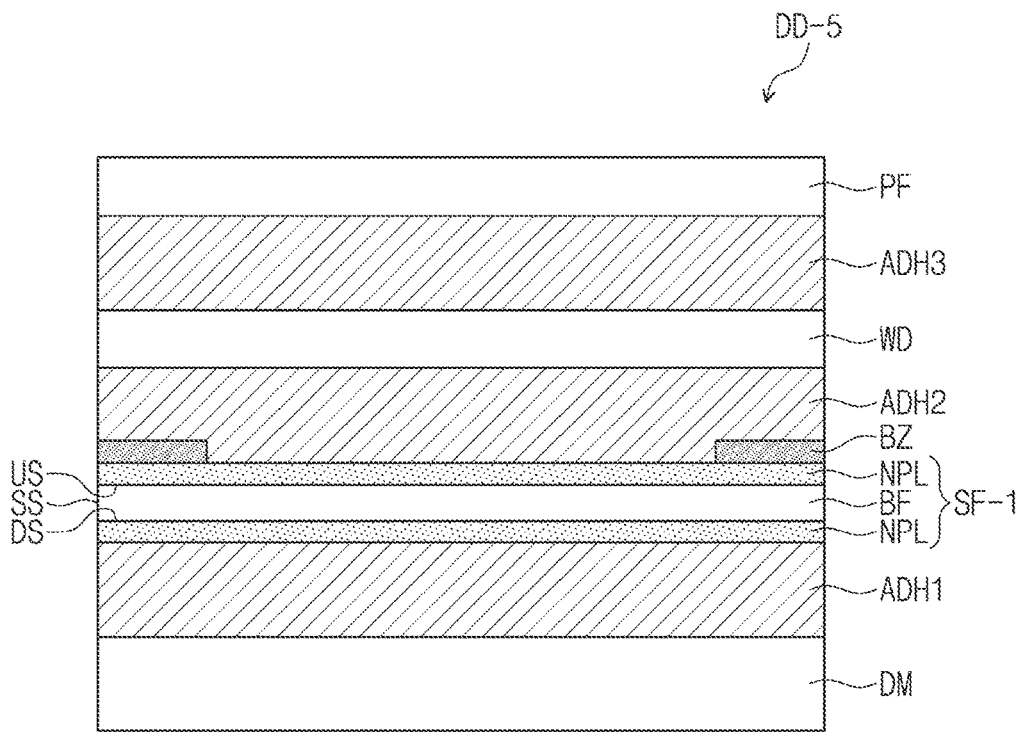
Figure 4D:
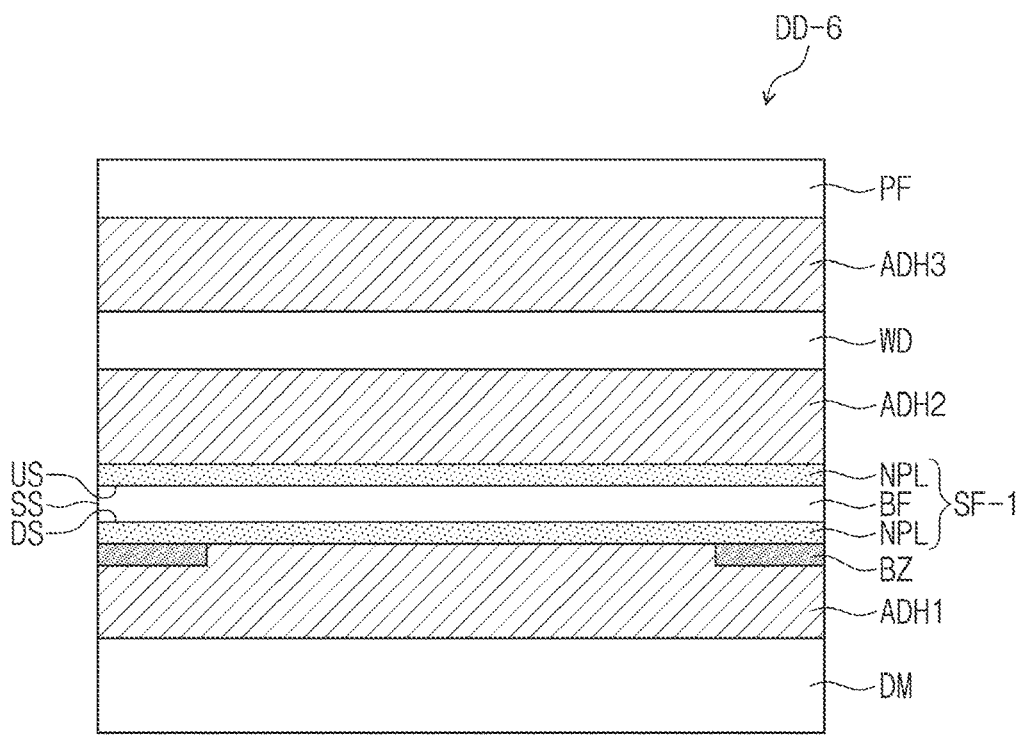

Referring to FIGS. 4C and 4D, in a buffer film SF-1 of each of the display devices DD-5 and DD-6 according to one or more embodiments, the nanoparticle coating layer NPL may be directly provided on the top and bottom surfaces of the base film BF. In this case, the light blocking layer BZ may be provided on the nanoparticle coating layer NPL.

When the nanoparticle coating layer NPL is provided on each of the top surface US and the bottom surface DS of the base film BF as described with reference to FIGS. 4C and 4D, the refractive index of the nanoparticle coating layer NPL may have a value satisfying both a value between the refractive index of the first adhesive layer ADH1 and the refractive index of the base film BF, and a value between the refractive index of the second adhesive layer ADH2 and the refractive index of the base film BF.

Hereinafter, the display module DM according to one or more embodiments will be described in more detail with reference to FIGS. 5 and 6.

Figure 5:
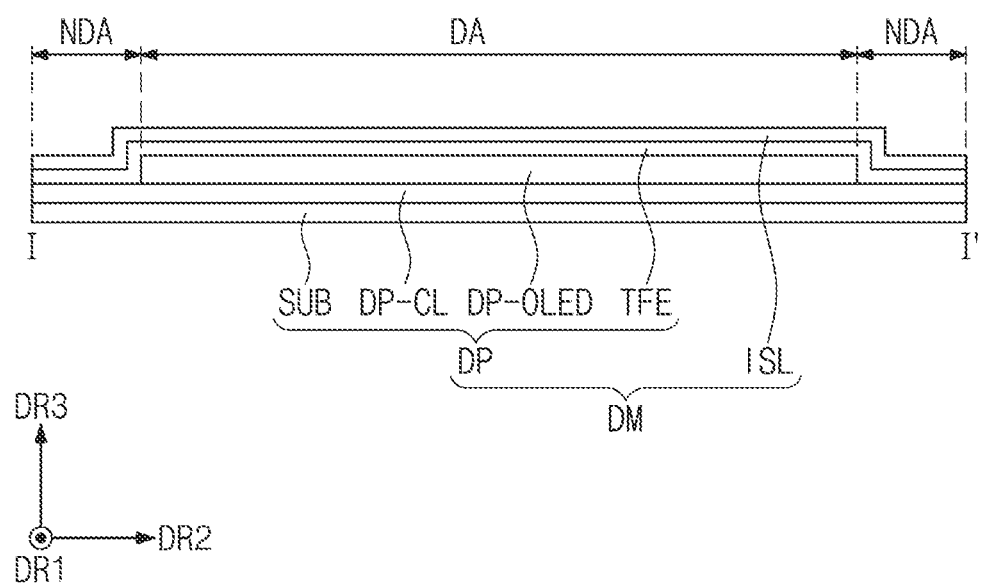
FIG. 5 is a cross-sectional view of a display module according to one or more embodiments of the present disclosure.

FIG. 5 is a cross-sectional view of the display module DM, taken along line I-I' of FIG. 2. FIG. 6 is a cross-sectional view of the display panel DP according to one or more embodiments of the present disclosure.

Figure 6:
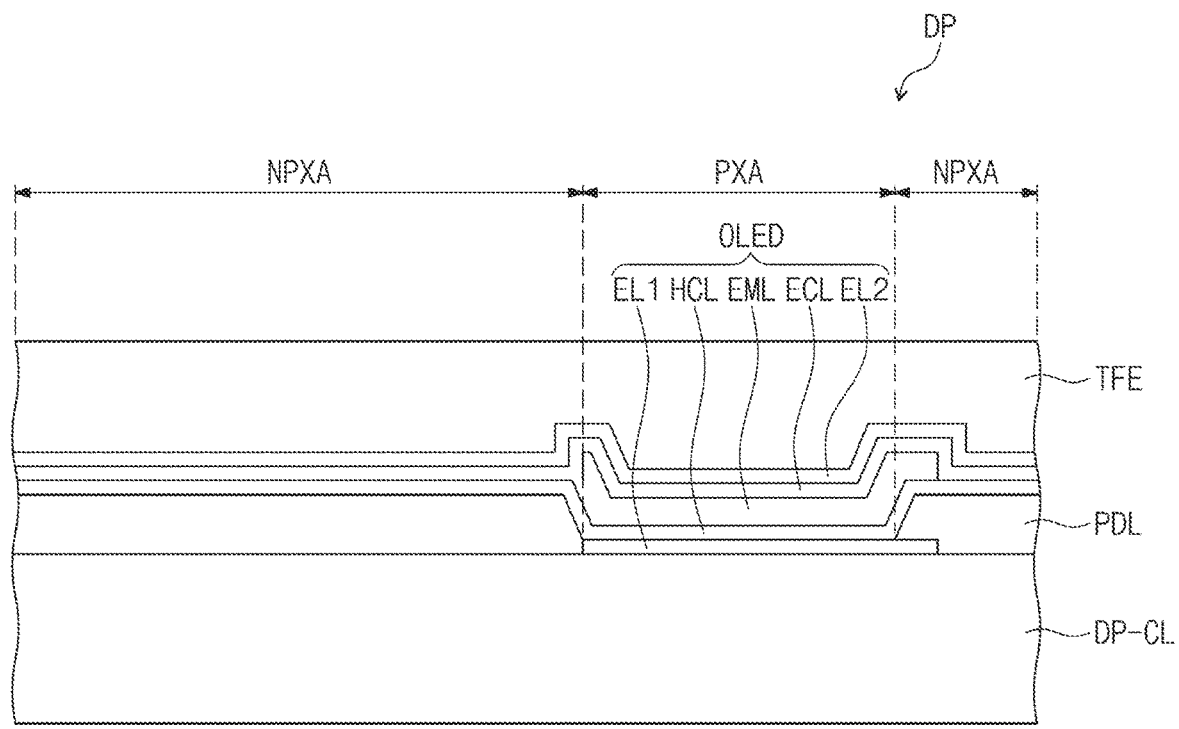
FIG. 6 is a cross-sectional view of the display panel according to one or more embodiments of the present disclosure.

Referring to FIGS. 5 and 6, the display panel DP includes a substrate SUB, a circuit element layer DP-CL, a display element layer DP-OLED, and a thin film encapsulation layer TFE, which are sequentially laminated.

The display panel DP includes a display area DA and a non-display area NDA. The display area DA of the display panel DP may correspond to the display area DD-DA of FIGS. 1A-1C or the transmission area TA of FIG. 2, and the non-display area NDA may correspond to the non-display area DD-NDA of FIG. 1 or the non-transmission area NTA of FIG. 2.

The substrate SUB may include at least one plastic film. The substrate SUB may include a plastic substrate, a glass substrate, a metal substrate, or an organic/inorganic composite substrate as a flexible substrate. The substrate SUB may include a synthetic resin film. The synthetic resin layer may include a thermosetting resin. The substrate SUB may have a multi-layered structure. For example, the substrate SUB may have a three-layered structure of a synthetic resin layer, an adhesive layer, and a synthetic resin layer. In some embodiments, the synthetic resin layer may be a polyimide resin layer, and the material thereof is not particularly limited. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, or a perylene-based resin. In some embodiments, the substrate SUB may include a glass substrate, a metal substrate, and/or an organic/inorganic composite substrate.

The circuit element layer DP-CL may include at least one intermediate insulating layer and a circuit element. The intermediate insulating layer includes at least one intermediate inorganic film and at least one intermediate organic film. The circuit element may include signal lines, a driving circuit of a pixel, and the like.

A display element layer DP-OLED may include an organic light emitting diode OLED. The organic light emitting diode OLED may include a first electrode EL1, a hole transport layer HCL, an emission layer EML, an electron transport layer ECL, and a second electrode EL2, which are sequentially laminated. The first electrode EL1 may be an anode. Also, the first electrode EL1 may be a pixel electrode. The light emitting layer EML may include an organic light emitting material, but an embodiment is not limited thereto, and the light emitting layer EML may include an inorganic light emitting material such as quantum dots or quantum bars. The second electrode EL2 may be a common electrode or a cathode.

Although not shown, the organic light emitting diode OLED may further include a capping layer provided on the second electrode EL2. The capping layer may be a layer for protecting the organic light emitting diode OLED and/or for adjusting optical properties.

The display element layer DP-OLED may further include an organic layer such as a pixel defining layer PDL. The pixel defining layer PDL may be provided on the circuit layer DP-CL to expose a portion of the first electrode EL1. The pixel defining layer PDL may define an emission area PXA and a non-emission area NPXA adjacent to the emission area PXA.

The thin film encapsulation layer TFE seals the display element layer DP-OLED. The thin film encapsulation layer TFE may be provided on the organic light emitting diode OLED. For example, the thin film encapsulation layer TFE may be provided on the second electrode EL2. In some embodiments, when the organic light emitting diode OLED further includes a capping layer (not shown), the thin film encapsulation layer TFE may be directly provided on the capping layer. The encapsulation layer TFE may include at least one organic layer and at least one inorganic layer. For example, the thin film encapsulation layer TFE may include a lamination structure of an inorganic layer/organic layer/inorganic layer. The thin film encapsulation layer TFE may protect the display element layer DP-OLED against foreign substances such as moisture, oxygen, and dust particles.

The input sensing layer ISL may be provided on the display panel DP. Although not shown, the input sensing layer ISL may include an insulating layer and a conductive layer. A base insulating layer may be provided under the input sensing layer ISL. The base insulating layer may be an inorganic insulating layer.

The input sensing layer ISL and the display panel DP may be manufactured by a continuous process. The input sensing layer ISL may be directly provided on the display panel DP.

Figure 7:
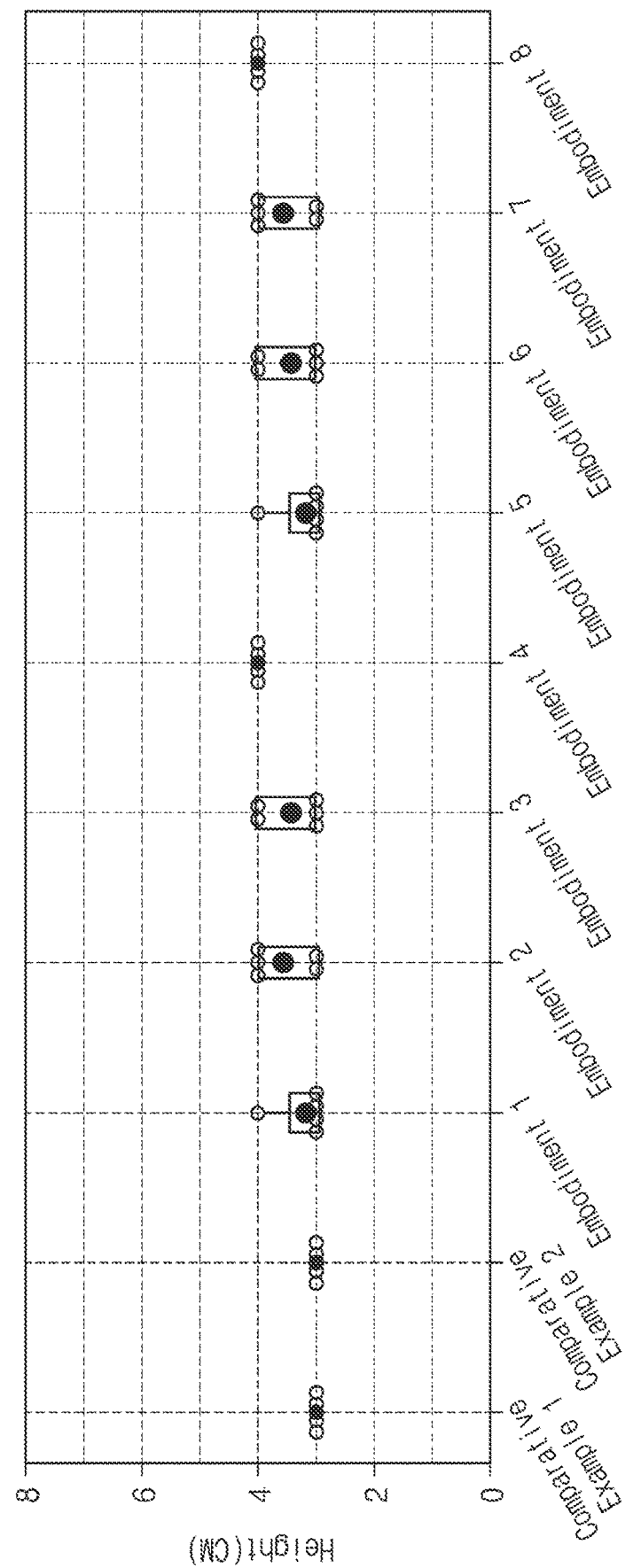
FIG. 7 is a graph illustrating results of a durability test of the display device.
Figure 8A:
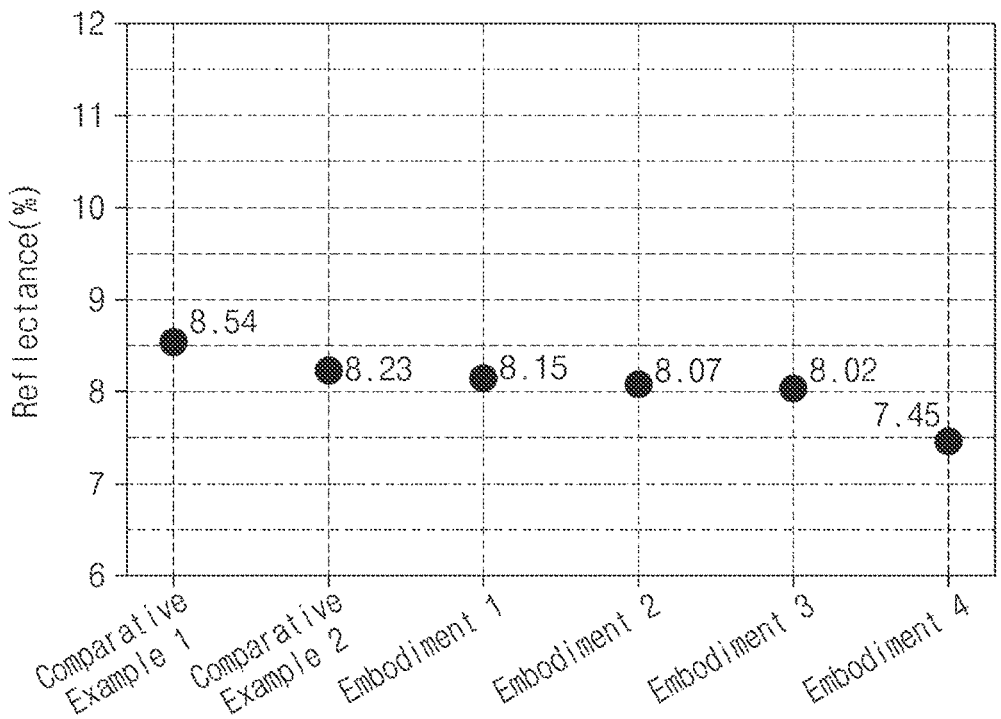
FIG. 8A is a graph illustrating results of a reflectance test of the display device.
Figure 8B:
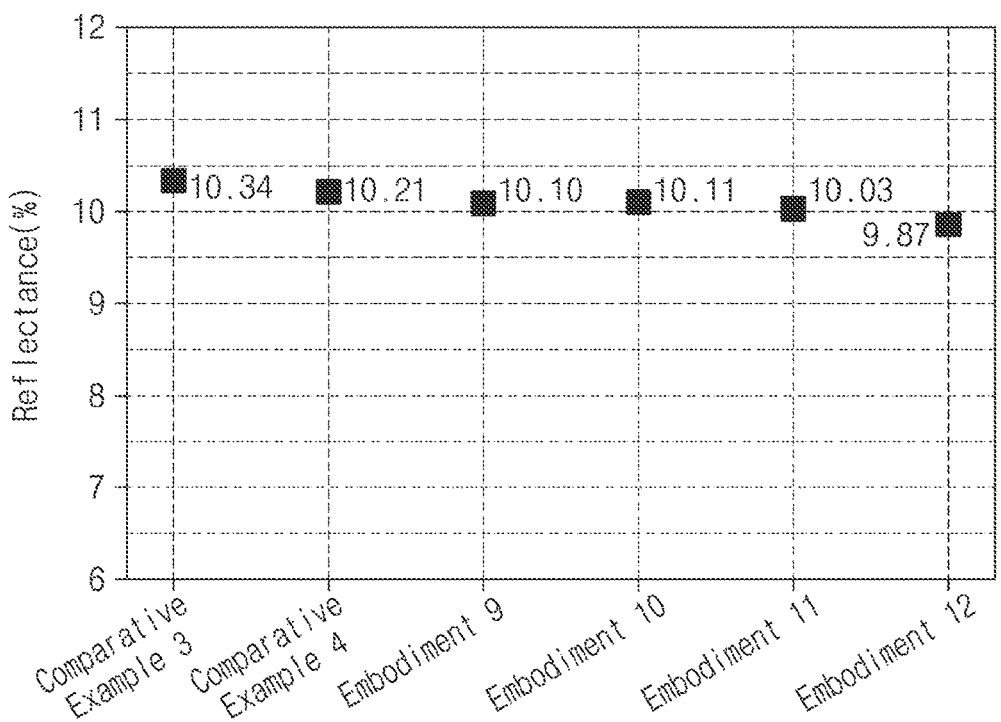
FIG. 8B is a graph illustrating results of a reflectance test of a buffer film according to one or more embodiments of the present disclosure.

FIG. 7 is a graph illustrating results of a durability test of the display device DD. FIG. 8A is a graph illustrating results of a reflectance test of the display device DD. FIG. 8B is a graph illustrating results of a reflectance test of the buffer film SF.

Hereinafter, the display device DD according to one or more embodiments of the present disclosure will be described in more detail with reference to FIGS. 7, 8A, and 8B, as well as to Embodiments and Comparative Examples. However, the following embodiments are merely examples to aid understanding of the inventive concept, and the scope of the present disclosure is not limited thereto.

1. Evaluation of Durability of Display Device According to Content of Nanoparticles 1) Manufacture of Display Device for Durability Evaluation A display device having a lamination structure of "display module/first adhesive layer/light blocking layer/base film/nanoparticle coating layer/second adhesive layer/window/third adhesive layer/protective film", as illustrated in FIG. 3B, according to Embodiment 1 to Embodiment 4 was manufactured to evaluate durability.

The base film was formed using a polyethylene terephthalate film having a thickness of 23 micrometers. The nanoparticle coating layer was formed in a size of 5 micrometers by mixing full-type $SiO_2$ nanoparticles with a urethane acrylate binder. Spherical or semi-spherical nanoparticles having a diameter of about 40 nanometers were used. The window was formed using a thin film glass substrate having a thickness of 30 micrometers, and the protective film was formed using a polyimide film having a thickness of 40 micrometers. The first adhesive layer had a thickness of 25 micrometers, the second adhesive layer had a thickness of 50 micrometers, and the third adhesive layer had a thickness of 50 micrometers.

The display devices according to Embodiments 5 to 8 were manufactured in substantially the same manner as in Embodiment 1, except that the nanoparticle coating layer is provided under the base film, and the light blocking layer is provided on the base film as illustrated in FIG. 3A. A ratio of the total weight of the plurality of nanoparticles to the total weight of the nanoparticle coating layer in each of Embodiments 1 to 8 is shown in Table 1.

The display device according to Comparative Example 1 was manufactured in substantially the same manner as in Embodiments 1 to 4 except that the nanoparticle coating layer was not provided, and the display device according to Comparative Example 2 was manufactured in substantially the same manner as in Embodiments 1 to 4 except that the nanoparticle coating layer did not include nanoparticles.

TABLE 1

|  | Embodiments 1, 5 | Embodiments 2, 6 | Embodiments 3, 7 | Embodiments 4, 8 |
| --- | --- | --- | --- | --- |
| Ratio (wt %) of total weight of plurality of nanoparticles | 7.5 | 42.1 | 62.9 | 86.7 |

2) Method for Evaluating Durability

Evaluation was carried out using a ballpoint pen of BIC's Orange fine model. After inserting a cap of the ballpoint pen behind the ballpoint pen, and then, the ballpoint pen drops down so that a ballpoint pen lead is in contact with the display device while increasing in height of the ballpoint pen (raising the ballpoint pen) by 1 centimeter, a maximum height (cm) at which pixel defects (for example, bright or dark spots) do not occur was measured. The evaluation was repeated a total of 5 times for each Embodiment and Comparative Example.

3) Evaluation Result

FIG. 7 illustrates the results of evaluation repeated five times for each Example and Comparative Example. A maximum height at which the defects do not occur in the display device was indicated by a circle, and an average maximum height at which the defects do not occur in the display device was indicated by a black circle.

Referring to FIG. 7, in the display devices according to Comparative Examples 1 and 2, the pixel defects occurred five times at a height of 3.0 cm. On the other hand, referring to Embodiments 1 and 5, the maximum height at which the defects do not occur was 4.0 cm, and the average maximum height at which defects occurs was 3.2 cm. As a result, it was confirmed that there in an effect of improving the durability when the nanoparticles are contained at a weight ratio of about 7%.

In addition, the average maximum height at which the defects do not occur in Embodiments 2, 3, and 6 was 3.4 cm, the average maximum height at which the defects do not occur in Embodiment 7 was 3.6 cm, and the average maximum height at which the defects do not occur in Embodiments 4 and 8 was 4.0 cm. As a result, it was confirmed that the durability of the display device is improved as the weight ratio of nanoparticles increases.

It is believed that the display devices according to Embodiments 1 to 8 improved in durability by sufficiently or suitably absorbing an impact applied from the outside because the nanoparticle coating layer includes the nanoparticles.

2. Evaluation of External Light Reflectance According to Content of Nanoparticles 1) Manufacturing of Buffer Film and Display Device for Reflectance Evaluation External light reflectance was evaluated for the display devices according to Embodiments 1 to 4 and the display devices according to Comparative Examples 1 and 2. In Embodiments 9 to 12, external light reflectance was evaluated using a single buffer film used in the display devices according to Embodiments 1 to 4 (e.g., the buffer film of Embodiments 1 to 4 including a base film and a nanoparticle coating layer). In Comparative Examples 3 and 4, external light reflectance was evaluated using a single buffer film used in the display devices according to Comparative Examples 1 and 2 (e.g., the buffer film of Comparative Examples 1 and 2 including a base film and a nanoparticle coating layer).

2) Evaluation Result

Referring to FIG. 8A, in the case of the display device including the nanoparticle coating layer containing the nanoparticles according to Embodiments 1 to 4, the external light reflectance was low compared to the case, in which the nanoparticle coating layer is provided, according to Comparative Example 1 and the case, in which the nanoparticle coating layer is not provided, according to Comparative Example 2. Referring to FIGS. 8B, the buffer film of Embodiments 1 to 4 evaluated according to Embodiments 9 to 12 had external light reflectance less than that of each of the buffer film, in which the nanoparticle coating layer is not provided, according to Comparative Example 3 and the buffer film, in which the nanoparticles are not provided, according to Comparative Example 4. Particularly, it is believed that, as the weight ratio of nanoparticles increases, the reflectance becomes lower. Because the display device and the buffer film according to embodiments include the nanoparticle coating layer containing the nanoparticles, it is believed that the reflectance of the external light is lowered.

The display device according to one or more embodiments includes the buffer film. The buffer film includes the base film and the nanoparticle coating layer. The nanoparticle coating layer is provided on at least one surface of the base film. The nanoparticle coating layer includes the binder and the plurality of nanoparticles dispersed in the binder. Thus, the display device according to the embodiments may absorb the external impact and have the low external light reflectance. Therefore, the display device according to the embodiment may achieve the excellent durability and visibility.

It will be apparent to those skilled in the art that various modifications and variations can be made in the present disclosure. Thus, it is intended that the present disclosure covers the modifications and variations of this disclosure provided they come within the scope of the appended claims and their equivalents. Thus, to the maximum extent allowed by law, the scope of the present disclosure is to be determined by the broadest permissible interpretation of the following claims and their equivalents, and shall not be restricted or limited by the foregoing detailed description.

The display device may be configured to provide the image to the user, and thus, it may be necessary to improve the durability and visibility. Therefore, the present disclosure related to the display device has high industrial applicability.

The invention claimed is:

1. A display device comprising:
a display module;
a glass substrate on the display module;
a buffer film between the display module and the glass substrate; and
a light blocking layer directly on a partial area of the buffer film,
wherein the buffer film comprises a base film and a nanoparticle coating layer on at least one surface of the base film, the nanoparticle coating layer comprising a binder and a plurality of nanoparticles, and
wherein the display device further comprises an adhesive layer directly on the nanoparticle coating layer, the nanoparticle coating layer being entirely below the adhesive layer.

2. The display device of claim 1, wherein a ratio of a total weight of the plurality of nanoparticles to a total weight of the nanoparticle coating layer is 7% and more to 90% or less.

3. The display device of claim 1, wherein each of the plurality of nanoparticles has a diameter of 10 nanometers or more and 1,000 nanometers or less.

4. The display device of claim 1, wherein the binder comprises at least one of an acrylic compound, a urethane compound, a siloxane compound, an imide compound, or an epoxy compound.

5. The display device of claim 1, wherein each of the plurality of nanoparticles has a hollow structure, a pore structure, or a full-type structure.

6. The display device of claim 1, wherein the base film comprises:
a top surface;
a bottom surface facing oppositely away from the top surface; and
a side surface connected to the top surface and the bottom surface,
wherein the nanoparticle coating layer is directly on at least one surface of the top surface or the bottom surface.

7. The display device of claim 6, wherein the light blocking layer is directly on a surface of the base film facing oppositely away from the surface on which the nanoparticle coating layer is directly provided.

8. The display device of claim 1, wherein the base film has a thickness of 20 micrometers or more and 100 micrometers or less, and
the nanoparticle coating layer has a thickness of 1 micrometer or more and 10 micrometers or less.

9. The display device of claim 1, wherein the base film comprises at least one of polyimide, polyethylene terephthalate, polycarbonate, cycloolefin polymer, or triacetyl cellulose, and has a visible light transmittance of about 80% or more.

10. The display device of claim 1,
wherein a refractive index of the nanoparticle coating layer has a value between a refractive index of an adjacent adhesive layer and a refractive index of the base film.

11. The display device of claim 1, wherein the glass substrate is configured to be folded based on at least one folding axis.

12. The display device of claim 1, wherein the glass substrate has a thickness of 10 micrometers or more and 100 micrometers or less.

13. The display device of claim 1, wherein the display module comprises:
a display element layer;
a thin film encapsulation layer configured to seal the display element layer; and
an input sensing layer directly on the thin film encapsulation layer.

14. The display device of claim 1, wherein the light blocking layer comprises at least one of a dye or a pigment.

15. A foldable display device comprising:
a display module;
a glass substrate on the display module and comprising a folding area and a non-folding area adjacent to the folding area;
a buffer film between the display module and the glass substrate; and
a light blocking layer directly on a partial area of the buffer film,
wherein the buffer film comprises a base film and a nanoparticle coating layer on at least one surface of the base film, the nanoparticle coating layer comprising a binder and a plurality of nanoparticles, and
a ratio of a total weight of the plurality of nanoparticles to a total weight of the nanoparticle coating layer is 7% and more to 90% or less, and
wherein the display device further comprises an adhesive layer comprising a first adhesive layer between the glass substrate and the buffer film, the nanoparticle coating layer being entirely below the first adhesive layer.

16. The foldable display device of claim 15, wherein each of the plurality of nanoparticles has a full-type structure.

17. The foldable display device of claim 15, wherein each of the plurality of nanoparticles comprises silica, a carbon nanotube, or a carbon nanofiber.

18. The foldable display device of claim 15, wherein the adhesive layer further comprises a second adhesive layer between the buffer film and the display module.

19. The foldable display device of claim 18, wherein the base film has a refractive index of 1.5 or more and 1.6 or less,
the adhesive layer has a refractive index of 1.4 or more and 1.5 or less, and
the nanoparticle coating layer has a refractive index greater than that of the adhesive layer, and the base film has a refractive index greater than that of the nanoparticle coating layer.

20. A display device comprising:
a display module;
a buffer film on the display module;
a glass substrate on the buffer film and having a thickness of 10 micrometers or more and 100 micrometers or less; and
an adhesive layer comprising a first adhesive layer between the buffer film and the glass substrate and a second adhesive layer between the display module and the buffer film,
wherein the buffer film comprises a base film and a nanoparticle coating layer on at least one surface of the base film, the nanoparticle coating layer comprising a binder and a plurality of nanoparticles,
the nanoparticle coating layer has a thickness of 1 micrometer or more and 10 micrometers or less, and
the nanoparticle coating layer is entirely below the first adhesive layer.

* * * * *